United States Patent [19]
Holcombe

[11] Patent Number: 5,946,393
[45] Date of Patent: Aug. 31, 1999

[54] DATA ACCESS ARRANGEMENT

[75] Inventor: Wayne T. Holcombe, Palo Alto, Calif.

[73] Assignee: Integration Associates, Inc., Mountain View, Calif.

[21] Appl. No.: 08/798,507

[22] Filed: Feb. 10, 1997

[51] Int. Cl.$^6$ .................................................. H04M 9/00
[52] U.S. Cl. ..................... 379/399; 379/100.15; 379/413
[58] Field of Search ................................. 379/399, 413, 379/387, 402, 403, 405, 395; 323/312, 313, 316; 330/297, 250; 359/341, 345

[56] References Cited

U.S. PATENT DOCUMENTS

| | | | |
|---|---|---|---|
| 3,167,722 | 1/1965 | Weller | 330/59 |
| 3,410,961 | 11/1968 | Slana | 179/18 |
| 3,504,127 | 3/1970 | Slana | 179/16 |
| 4,055,729 | 10/1977 | Vandling | 379/100.15 |
| 4,056,719 | 11/1977 | Waaben | 250/199 |
| 4,064,377 | 12/1977 | Regan | 179/170 NC |
| 4,167,682 | 9/1979 | O'Dea | 307/237 |
| 4,190,747 | 2/1980 | Feiner et al. | 179/170 NC |
| 4,282,604 | 8/1981 | Jefferson | 455/602 |
| 4,423,436 | 12/1983 | Kimura | 358/98 |
| 4,479,066 | 10/1984 | Embree | 307/350 |
| 4,558,183 | 12/1985 | Corris et al. | 179/84 A |
| 4,649,267 | 3/1987 | Ray | 250/205 |
| 4,965,444 | 10/1990 | Howe | 250/205 |
| 5,125,027 | 6/1992 | Blaszykowski et al. | 379/399 |
| 5,132,828 | 7/1992 | Conner et al. | 359/173 |
| 5,144,287 | 9/1992 | Remson | 340/664 |
| 5,245,645 | 9/1993 | Wilkison et al. | 379/405 |
| 5,329,115 | 7/1994 | Lim | 250/214 R |
| 5,335,109 | 8/1994 | Heidmann | 359/341 |
| 5,465,298 | 11/1995 | Wilkison et al. | 379/406 |
| 5,481,606 | 1/1996 | Andrieu et al. | 379/399 |
| 5,506,900 | 4/1996 | Fritz | 379/402 |
| 5,528,686 | 6/1996 | Cwynar et al. | 379/405 |
| 5,717,752 | 2/1998 | Whitney | 379/399 |

FOREIGN PATENT DOCUMENTS

| | | | |
|---|---|---|---|
| 61-156913 | 7/1986 | Japan | H03H 11/02 |
| 5-145360 | 6/1993 | Japan | H03G 3/20 |
| WO 94/06215 | 3/1994 | WIPO | H04B 1/58 |

OTHER PUBLICATIONS

CP Clare Corporation Brochure, "Linear Optocoupler P/N LOC210P," LOC210P Preliminary Specifications —Jun. 10, 1995.

AT&T Microelectronics Brochure, "ATTD2560ABL Interface Circuit for Optically Coupled Data Access Arrangements," Advanced Data Sheet —Apr. 1994, PP. 1–12.

CP Clare Corporation Brochure, "LOC110 Linear Optocoupler,"Performance Specifications –Nov. 1994.

*Primary Examiner*—Forester W. Isen
*Assistant Examiner*—Jacques Saint-Surin
*Attorney, Agent, or Firm*—Marger Johnson & McCollom P.C.

[57] ABSTRACT

A data access arrangement generates a first current in a first current path which runs from a tip terminal of a line pair through a light emitting diode of an opto-isolator to a sense node. The data access arrangement also generates a second current in a second current path that runs from the tip terminal to the sense node. The first current is modulated in response to an audio input signal received from the telephone line pair, while the second current is modulated in response to a potential generated at the sense node, such that a third current flowing from the sense node to the ring terminal remains at a substantially constant predetermined magnitude.

13 Claims, 7 Drawing Sheets

2 national standard which varies from one country to another in the range of 20 to 120 mA.

FIGS. 3a through 3d illustrate a number of conventional DC holding circuits. Darlington holding circuit 300 in FIG. 3a is one example of a typical holding circuit. Resistors 302 and 304 form a resistive divider network that charges holding capacitor 306 to drive the base of transistor 308 which combines with transistor 310 to form a Darlington pair. The Darlington pair, in turn, generate the holding current which runs through resistor 312. In this type of holding circuit, holding capacitor 306 is still relatively large, 1 $\mu$F, which generally must be provided as a large discrete capacitor, such as an electrolytic, that generally must be an external component in an integrated circuit (IC) implementation of a DAA. Large external capacitors and other components add to the overall cost of the DAA, consume real estate and create fitting problems in applications requiring small size, such as a PCMCIA card size modems.

Another typical holding circuit is the holding coil circuit 320 of FIG. 3b. The holding current simply runs through holding coil 322. This type of holding circuit is quite simple, but does encounter problems. In order to prevent saturation of holding coil 322 at lower frequencies, the inductance of the coil must be rather high. Typically, the inductance has a value from 2.5 to 10 Henries. In order to prevent saturation of holding coil 322 from DC currents, as the inductance of the coil increases, the coil must be proportionally larger. Furthermore, in order for the impedance of holding coil 322 to be relatively high at audio frequencies (i.e., 300 Hz to 3000 Hz for telephone line environments) such a holding coil must be physically large. Such inductors, however, still tend to perform poorly when operated over a wide range of frequencies. Inductors are also difficult to construct at small sizes and therefore tend to be physically large, which is a problem with small size applications such as PCMCIA card size modems. Inductors also tend to be comparatively costly components in the DAA.

Field effect transistor (FET) holding circuit 340 in FIG. 3c is made up of a resistive divider network with resistors 342, 344 and 346 which develops a predetermined voltage on holding capacitor 348 which drives the gate terminal of FET 350 to produce a predetermined holding current in the range of 20 to 120 mA flowing between the drain and source. Holding capacitor 348 is relatively small, in the range of 470 nF, but FET 350 has large gate voltage variation and the Early voltage of FET 350 is lower resulting in lower line termination impedance and higher distortion in the signals transmitted and received by the DAA.

Op amp holding circuit 360 in FIG. 3d uses a resistive divider made up of resistors 362 and 366 which charge up holding capacitor 364 to produce a control voltage at the non-inverting input to op amp 368. The output of op amp 368 drives the base of transistor 370 to produce the holding current which runs through resistor 372. The voltage produced at the emitter terminal of transistor 370 is connected to the inverting terminal of op amp 368 to provide negative feedback and stabilize the circuit. This circuit represents an improvement over the other circuits but nonetheless utilizes current that cannot be used to drive other circuits in the DAA.

Another function performed by DAAs is for AC signal transfer while maintaining high DC isolation between the line side of the DAA and the telephone device or modem side of the DAA.

Opto-isolators are often used in DAAs to provide AC signal transfer and DC isolation in lieu of transformer based

DATA ACCESS ARRANGEMENT

BACKGROUND OF THE INVENTION

1. Field of the Invention

The present invention is directed toward a Data Access Arrangement (DAA) with an improved current control circuit and method for controlling the current drawn from a telephone line pair to drive a communications transfer mechanism with variable gain, such as the light emitting diodes (LEDs) in an opto-isolator utilized with the DAA.

2. Description of the Related Art

DAAs are used to provide the interface between a telephone line pair (tip and ring pair) and a telephone device such as a modem. There are several functions which a DAA is required to perform.

Typically, the DAA should present a controlled AC (alternating current) impedance of approximately 600 ohms. FIGS. 1a and 1b illustrate two conventional approaches to a 600 ohm AC termination. In the circuit of FIG. 1a a minimum voltage drop of 2.2 volts (at 3.7 milliamperes) is required for +6 dbm.

The telephone line pair can also be terminated using a series connection of resistor 102 and capacitor 106 as in AC termination 110 of FIG. 1b. Whereas AC termination 110 does not draw, in the steady state, DC current, capacitor 106 must be fairly large, in the range of 10 $\mu$F in size, which generally results in a large discrete electrolytic capacitor being part of the circuit. For small DAAs, such as a PCMCIA (Personal Computer Memory Card International Association) standard size card, whose components need to fit within a molded package whose total thickness is less than 0.1" thick, it is desirable to only use small capacitors with values of less than 0.1 uF.

In AC termination 100 in FIG. 1a, capacitor 106 is replaced by zener diode 104 connected in series with 600 ohm resistor 102 between $V_{DD}$ and ground. ($V_{DD}$ and ground are typically obtained from the tip and ring, such as by full-wave rectifying the voltages present on the tip and ring, and include both a DC level and an AC signal.) The need for a large capacitor is eliminated but AC termination 100 of FIG. 1a is required to draw 3.7 milliamperes (mA) in order to obtain AC signal magnitudes at the preferred level of +6 dBm. Any current drawn by the AC termination circuitry reduces the amount of current available for other functions.

A DAA must also transmit signals from the attached modem device to the telephone line pair. FIG. 2 illustrates a simplified circuit for a transmit transconductance output amplifier 200. Amplifier 222 amplifies the transmit signal (TX signal) which is received through an isolation device (a transformer or opto-isolator, which is discussed below) and drives transistor 224 to produce a current through transistor 224 and resistor 226 which modulates $V_{DD}$ to transmit the TX signal onto the tip and ring. In order to obtain transmit signals on $V_{DD}$ in the range of +6 dBm, the DC current level through resistor 226 must be on the order of 7.4 mA. This current drawn by transmit transconductance output amplifier 200 also reduces the amount of current available for other functions.

Yet another requirement is that the DAA draw a holding current in the range of 20 to 120 mA. By drawing the holding current from the telephone line, the DAA signals the central telephone office that it is active to either originate or complete a communications connection with the central office. The holding current is generally specified by a isolation (see Waaben, et al., U.S. Pat. No. 4,056,719). There is great commercial interest in linear opto-isolator based DAAs since they can potentially perform better than standard transformer based designs, over the range of modem frequencies, and have significant performance advantages in small DAA designs such as modem devices that fit in a PCMCIA standard sized module.

A typical opto-isolator DAA uses current from the telephone line pair to drive an LED which transmits the AC signal received from the telephone line pair side of the DAA to a light sensitive device on the modem side of the DAA, such as a light detecting diode (LDD), which is also called a photodiode, or a phototransistor. In order to linearize the response of the opto-isolator pair (the LED and LDD), opto-isolators typically include a second LDD, also called a servo LDD, to provide negative feedback of the light signal transmitted by the LED to the drive circuit for the LED.

DAAs that use line current from the telephone line pair must conform to the restrictions on the amount of current that can be drawn from the line. As discussed above, the amount of current drawn by an active DAA, the line holding current, is specified for telephone devices and is generally in the range of 20 to 120 milliamperes (mA) and is a function of the current provided by a telephone central switch, PBX or central office.

DAAs must also provide a sufficiently high terminating impedance to the telephone line pair so as not to load down the circuit driving the line pair from the telephone office. The impedance must be, for example, around 600 ohms in the United States.

In addition, it is important that the LED drive circuit not generate a feedback signal onto the telephone line as a result of transmitting the AC signal to the modem side. A feedback signal can arise as the AC signal drives the LED of the opto-isolator pair and the LED draws a corresponding amount of current from the telephone line pair. The current drawn from the telephone line will reflect the AC signal.

One method for preventing feedback is to return all AC (not DC) current going through the opto-isolator LED back to the source from which the LED is driven; that is, LED AC current travels in a loop which does not include tip & ring. This method is demonstrated in opto-isolator LED drive circuit 400 in FIG. 4.

LED drive circuit 400 uses a constant current source that is fed by two parallel current paths from $V_{DD}$ in the DAA. Two conventional devices utilizing variations of this parallel current path approach in DAAs using opto-isolators are U.S. Pat. No. 5,481,606 (Andrieu) and U.S. Pat. No. 5,528,686 (Cwynar). Cwynar drives the opto-isolator LED with a constant current source and places the LED in parallel with a transistor which controls the shunting of the constant current source around the LED. Andrieu uses the same parallel current path technique except that the constant current source is replaced by a holding circuit gyrator, an electronic inductor which acts as constant current source with high impedance at audio frequencies.

In FIG. 4, the AC signal AUDIO arriving on the TIP and RING terminals of the telephone line pair is input to audio amplifier 402. The output of audio amplifier 402 drives the base terminal of transistor 406 to cause current $I_1$ to flow from $V_{DD}$ through LED 412 and transistor 406 to current source 404. Holding current source 404 is designed to draw a predetermined current $I_3$ that must exceed the peak LED current (approximately 10–20 mA) and which remains at a constant level whenever the DAA circuit is active. The AC current component present in $I_1$ is compensated by an AC current component of $I_2$, since $I_3$ remains constant, which returns to $V_{DD}$ to suppress the distortion introduced by the AUDIO signal driving LED 412.

In the circuit of FIG. 4, the design utilizes separate circuits for the current source and the holding circuit. This produces a problem concerning the amount of current drawn from the telephone line pair. First, the current of the current source 404 must to be set to accommodate the worst case current (i.e. the maximum possible current) which may be needed to drive LED 412. Because the design utilizes separate holding and current source circuits, the current of the current source is not routed through the holding circuit and therefore reduces the amount of current that may be used by the holding circuit if the total DAA current drawn from the TIP and RING are to remain within the limitations imposed by a telephone switch. Although the worst case current may not be needed in actual use (because the actual opto-isolator being used in the DAA will usually require less current), it effectively places a lower limit on the minimum operating current for the DAA. For example, the magnitude of current $I_3$ of current source 404 may need to be set to over 12 mA in order to drive LED 412 in a worst case low efficiency linear opto-coupler 510 at peak AC line voltage. This means that minimum DAA operating current is not limited by the particular efficiency of the individual opto-isolator used but by the performance of worst case opto-isolator that might need to be used in the DAA. As a result, there is less current available for use in the holding circuit in FIG. 4. If the holding circuit is operated below its minimum operating current, then it will cease to function resulting in complete audio failure of the DAA and a significant decrease in impedance. Such a decrease in impedance will degrade the function of the telephone circuit, for as the DC impedance drops, clipping of the audio begins to occur.

Another approach to suppressing distortion, which utilizes current more efficiently than circuit 400 in FIG. 4, is the parallel current path method demonstrated in FIG. 5, which is a simplified illustration of the solution in Andrieu. When switchhook 568 is closed, the AC and DC signals present on the TIP and RING terminals of the telephone line pair are full-wave rectified to produce $V_{DD}$ and GND. The received audio signal is an AC signal superimposed upon $V_{DD}$ that is AC coupled to the input of amplifier 518 where it is amplified and coupled, through the output of amp 518, to the input of amplifier 502. The output of amp 502 drives the gate terminal of shunt transistor 504 to cause shunt current $I_1$ to flow from $V_{DD}$ through shunt transistor 504 to holding current transistor 506. The drive circuit for holding current transistor 506 is designed to produce a predetermined holding current $I_3$ that remains at a relatively constant level whenever DAA circuit 500 is active to ensure that the circuit remains in compliance with the requisite current standards.

LED 514 of opto-isolator 520 is connected in parallel with shunt transistor 504 such that LED current $I_2$ is summed with shunt current $I_1$ at node 505 as represented in the equation $I_3=I_1+I_2$. Because $I_3$ remains constant, any increase in one of $I_1$ or $I_2$ must be accompanied by a corresponding decrease in the other current. Therefore, as $I_1$ is modulated by the amplified audio signal output from amplifier 502, $I_2$ is inverse modulated resulting in a light signal which is received by modem 526 through LDD 516.

The circuit of FIG. 5 is an improvement over the circuit of FIG. 4 in that it uses the holding circuit as the current source for driving the LED of the opto-isolator. With this configuration the current available for driving LED 514 is not limited by the need to drive a separate holding circuit. If the LED drive current $I_2$ exceeds the holding circuit current $I_3$, then LED limiting occurs causing receive clipping but the holding circuit impedance, current draw and voltage drop across the telephone line do not change. Receive clipping is only likely to occur at low line currents and at peak receive audio levels, and only with low efficiency opto-isolators. In many applications some receive clipping is not a problem, since V.34 protocols, for example, can lower signal levels if clipping (distortion) is detected. Consequently, the FIG. 5 solution allows use of lower efficiency (less expensive) opto-isolators or setting higher LED bias current (which lowers noise and distortion) and results in better performance over a wider line current range. However, not only does an LED's efficiency and linearity decrease as the current drops, but the signal to noise ratio of a corresponding photodiode also decreases as the current drops.

In addition, the use of an NMOS transistor 506 in the holding circuit provides for an improvement in the size of the holding capacitor, reducing its size to 470 nF. However, there is a problem in DAA circuit 500 in that the NMOS gate tolerance thresholds vary by as much as 2–3 fold. When used in a simple holding circuit design as shown FIG. 5, this results in excessive variation in holding circuit voltage. Adjusting the gate biasing resistors 564 and 562 to minimize the holding circuit voltage with NMOS transistors with minimum gate thresholds will result in an excessive holding circuit voltage when using NMOS transistors with high gate thresholds. This excessive holding circuit voltage will produce objectionable DC resistance and excessive thermal dissipation at high line currents.

Another problem with the use of NMOS transistors arises when the DAA is implemented in an integrated circuit (IC). Typically the body connection on an NMOS transistor is connected to substrate in most commercial IC processes. This means that the effective gate voltage increases proportionally as the source voltage increases due to the "body effect", so much so that the gate voltage required to drive the NMOS current shunt LED control transistor 504 may exceed the voltage on $V_{DD}$. Since the driving circuitry is powered from $V_{DD}$, it is incapable of supplying a drive voltage greater than $V_{DD}$. Consequently, the solution shown in FIG. 5 will not work in most commercial CMOS or BICMOS integrated circuit processes.

Yet another problem with DAA 500 is that it requires both the holding circuit transistor 506 and the LED control transistor 504 (whether MOS or bipolar) be capable of passing the maximum line current (more than 120 mA). When implemented in IC technology, such transistors have large area which equates to increased cost. It is desirable to reduce the number of such high current transistors in an IC implementation of a DAA.

Another requirement for a DAA function is that it act as a transmit driver for transmitting a signal from the attached modem to the telephone line pair. This can present a problem when using a linear opto-isolator DAA because of the current requirements for the transmit driver. For example, 7.4 mA peak transmit drive is required to produce 2.2 volt peak (+6 dbm, sinewave) AC drop across an AC impedance of 300 ohms, a value equal to the parallel sum of the 600 ohm AC termination of the DAA and the nominal AC impedance of the telephone line, assumed to be 600 ohms for most test purposes. In order, for a transmit driver to provide up to 7.4 mA peak AC drive current or 14.8 mA peak to peak, its quiescent bias current, which it shunts from the telephone line, needs to equal or exceed its peak drive current capability.

For example, to provide +6 dbm AC drive capability, a minimum of 7.4 mA of transmit bias current would be required. Consequently, this 7.4 mA is current not available for LED drive current or holding current, even if this peak drive current is not required in a particular instance (such as when the DAA is only receiving or if a reduced transmitting level is acceptable). Consequently, if a DAA needs to provide +6 dbm of transmit capability and the receive LED requires a minimum 12 mA peak drive current and the current consumption of the remaining amplifiers and control circuitry is 4 mA, then the minimum line current required to meet these specifications would be 7.4 mA+12 mA+4 mA=23.4 mA. This current would be the same even if, in the particular circumstances, low transmit levels are acceptable. Obviously, this example exceeds the 20 mA minimum line current requirement. Two less desirable solutions to this problem are either to use more efficient linear opto-isolators, which are more expensive, so that the minimum peak LED drive needed is less or to reduce the peak transmit drive requirements to allow setting the transmit drive bias current to a lower value.

The example above highlights another problem: determining the correct transmit driver bias current. Setting the correct transmit driver bias current to the optimum value is a difficult design decision requiring foreknowledge about the peak transmit requirements in all applications and the minimum line currents which will be encountered in actual use. Setting the transmit driver bias current too high will result in excessive DAA failures on DAA/line combinations where the DAA is using low efficiency linear opto-isolators and the line current is low. Setting the transmit driver bias current too low may require setting transmit levels below optimum or result in excessive transmit clipping on some applications.

Yet another problem arises if no 2–4 wire transhybrid converter is used or if it is located on the DTE (modem) equipment side of the linear opto-isolator. A 2–4 wire transhybrid converts the full-duplex tip and ring pair into a receive pair and a transmit pair. If there is no transhybrid converter, then transmit AC drive signals will typically cause larger receive LED current changes than those current changes arising from receive signals, this is because transmit line signals are typically 14–16 dB larger than receive signals. Thus, the peak receive LED current will be significantly higher while transmitting than when only receiving. This is undesirable, resulting in higher peak receive LED current, less current available for other functions, or, if the receive LED current changes are reduced to lessen the effect of transmit induced current changes, the receive signal to noise ratio is degraded.

Still another potential problem with standard linear opto-isolator servo LED drivers are stability verses distortion performance problems. Linear opto-isolators can have significant multiple delay poles associated with the capacitance and internal delay of the servo photodiode or phototransistor and of the LED. These opto-isolator delay poles combined with the internal delay pole of a standard op amp make it difficult to achieve loop stability without adding complex compensation networks or without reducing the open loop gain which compromises distortion performance.

Another potential problem with standard linear opto-isolator DAAs when used on high speed modems is excessive thermal drift of the transfer AC gain through the linear opto-isolators. High speed modems perform very exact characterization of all the complex telephone line and DAA parameters following initial connection and prior to data transfer in order to allow the very accurate line behavior prediction required for echo canceling, line equalization, pre-emphasis, distortion correction, etc. Since linear opto-isolators can have a small but significant change in transfer gain with temperature, a 10 to 20 degree change in DAA temperature during a modem connection, which is typical in small modem and DAA applications, can cause a change in transfer gain sufficient to significantly degrade the modem's performance.

SUMMARY OF THE INVENTION

The problems discussed above are addressed in the present invention which is an apparatus and method for a DAA utilizing a current driven transfer mechanism with variable gain, such as a linear opto-isolator. The present invention produces a first current in a first current path through the current driven transfer mechanism, such as an LED in the opto-isolator, wherein the first current is modulated with a AC signal received from a telephone line pair. The present invention further produces a second current in a second current path within the DAA that is parallel to the first current path, wherein the first and second current combine at a summing node to produce a third current. The present invention also modulates the second current in response to a voltage signal present at the summing node such that the third current remains at a substantially constant predetermined magnitude.

Another embodiment of the present invention uses the third current as a holding current for the DAA.

DETAILED DESCRIPTION OF THE PREFERRED EMBODIMENTS

Figure 1A:
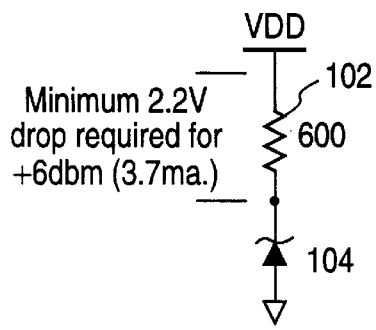
FIGS. 1a and 1b are simplified diagrams illustrating conventional 600 ohm impedance AC termination circuits.
Figure 1B:
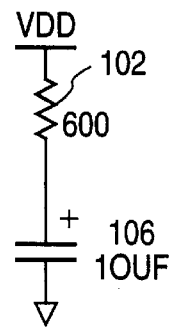
Figure 2:
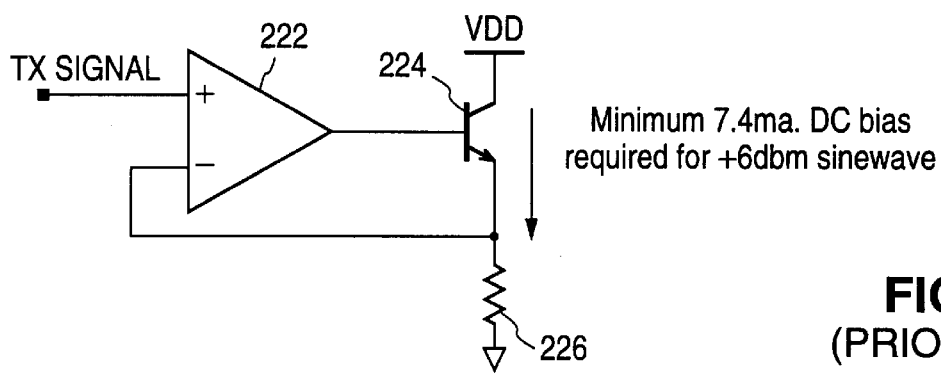
FIG. 2 is a simplified diagram of a conventional transmit signal output circuit.
Figure 3A:
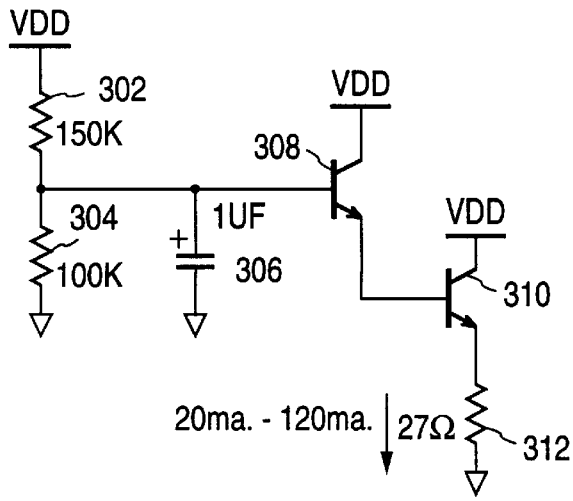
FIGS. 3a through 3b illustrate conventional DC holding circuits.
Figure 3B:
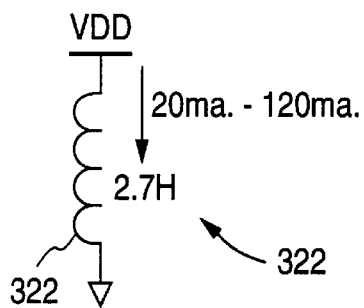
Figure 3C:
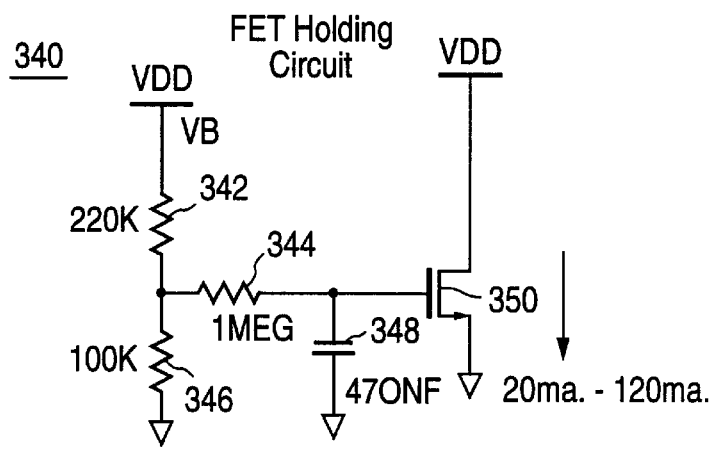
Figure 3D:
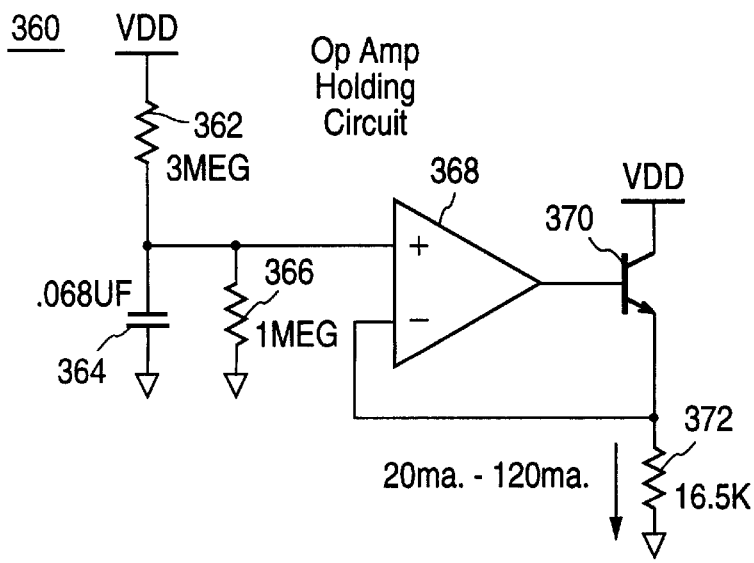
Figure 4:
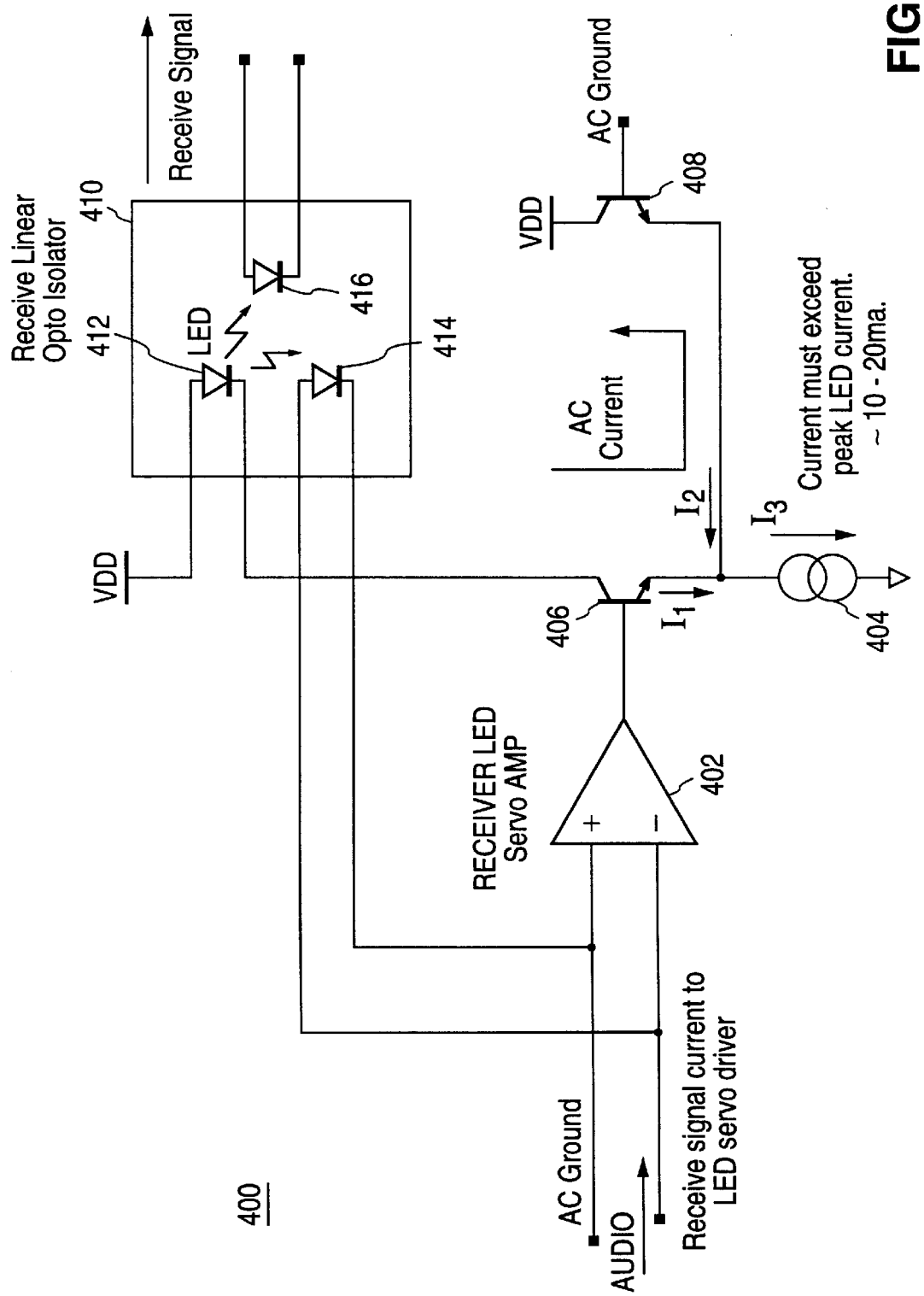
FIG. 4 is a simplified circuit diagram illustrating a conventional parallel current path receive LED drive circuit.
Figure 5:
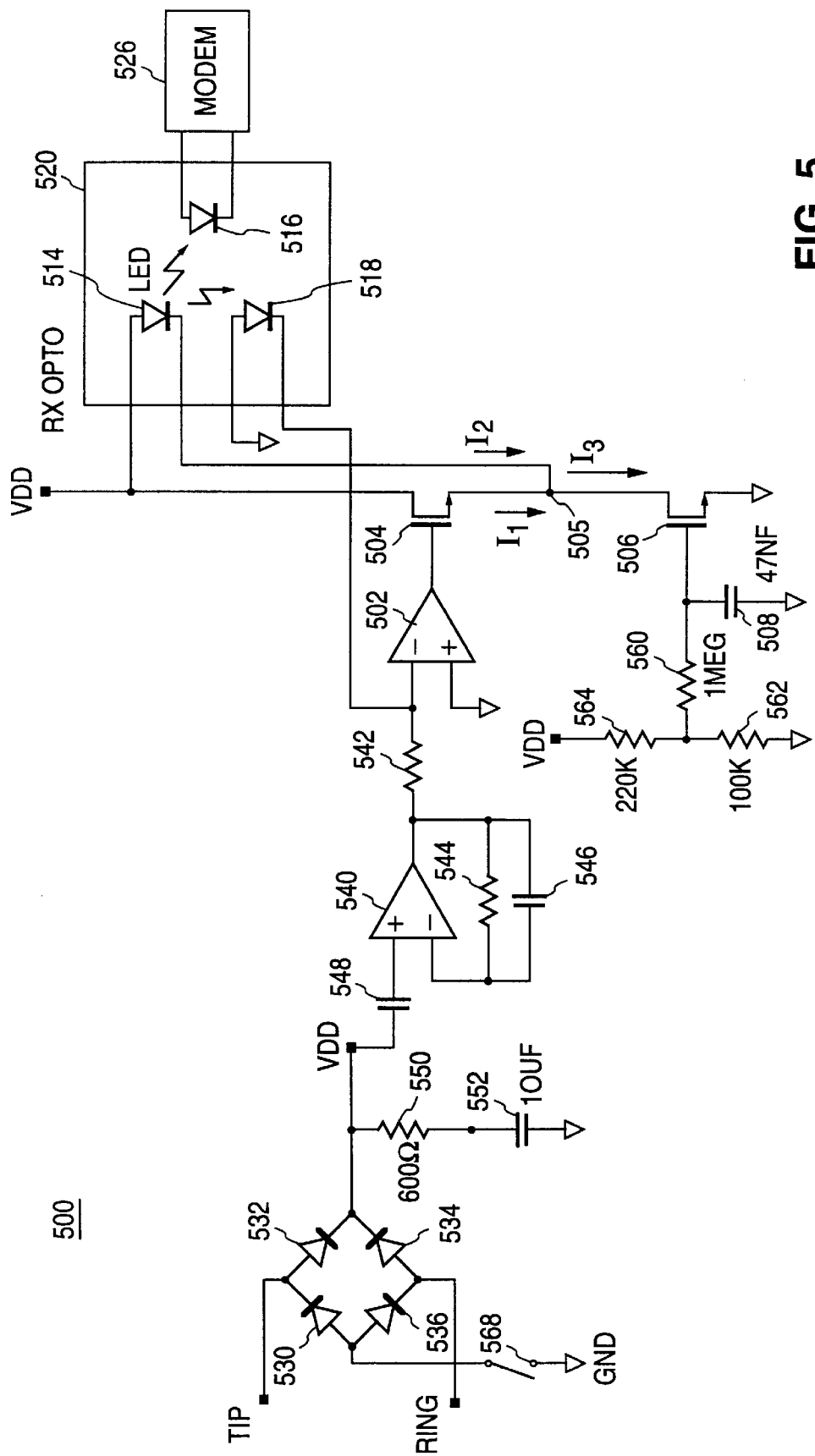
FIG. 5 is a circuit diagram of a conventional parallel current path receive LED driver combined with a holding circuit.
Figure 6:
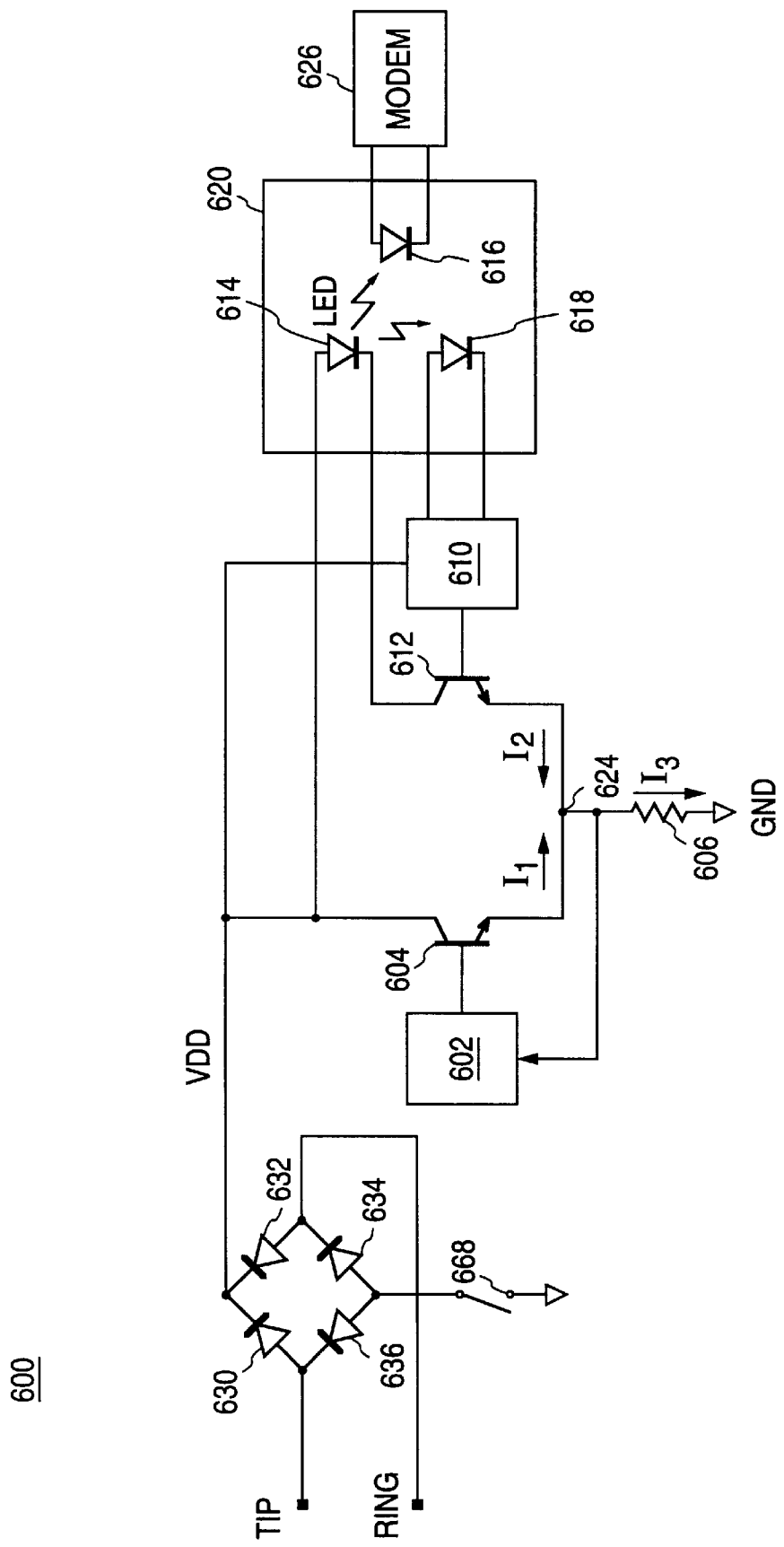
FIG. 6 is a simplified circuit diagram of an embodiment of the receive LED drive circuit of the present invention.

FIG. 6 illustrates a simplified embodiment of the present invention that is useful to explaining the operation of the present invention.

DAA 600 operates from voltage $V_{DD}$ which is obtained from the Tip and Ring terminals of the telephone line pair. $V_{DD}$ is obtained by full-wave rectification or other methods well known in the art. The signal received on Tip and Ring includes a DC current and an AC audio signal. The AC audio signal also appears on $V_{DD}$ and is AC coupled to the input of audio amplifier 610 of DAA 600. The output of audio amplifier 610 drives the base of transistor 612 with a control signal that is modulated by the audio signal such that current $I_2$ flows from the collector to the emitter of transistor 612 and drives LED 614 of opto-isolator 620 thereby transmitting the received audio signal to modem 626 via LDD 616.

Current $I_2$ flows from $V_{DD}$ through LED 614 and transistor 612 to node 624 where it combines with current $I_1$ to form current $I_3$. $I_3$ runs from node 624 through resistor 606 to circuit ground 608 which is coupled to the Tip and Ring terminals of the telephone line pair such that I3 is essentially the holding current flowing from the Tip to the Ring through DAA 600.

The voltage at node 624 is input to holding current correction circuit 602 which produces a holding circuit correction signal that drives transistor 604 to produce current $I_1$. Holding current correction circuit 602 modulates the holding circuit correction signal in response to the voltage at node 624 such that $I_1$ compensates for $I_2$ and $I_3$ remains at a substantially constant magnitude that conforms to the holding current provided by the telephone switch.

A benefit of the solution demonstrated in the embodiment of FIG. 6 is that substantially all of the holding current is available to drive the receive LED 614. Only about 4 mA of line current (used for powering amplifiers and control) does not go through the holding sense resistor 606. Another benefit of this design is that only one high current control transistor 604 is required to pass the maximum line current which may reach as high as 120 mA. The LED current control transistor 612 only passes the peak LED drive current, which is typically less than 12 mA. Reducing the number of high current transistors results in a cost reduction when implementing a DAA design in an IC.

Figure 7:
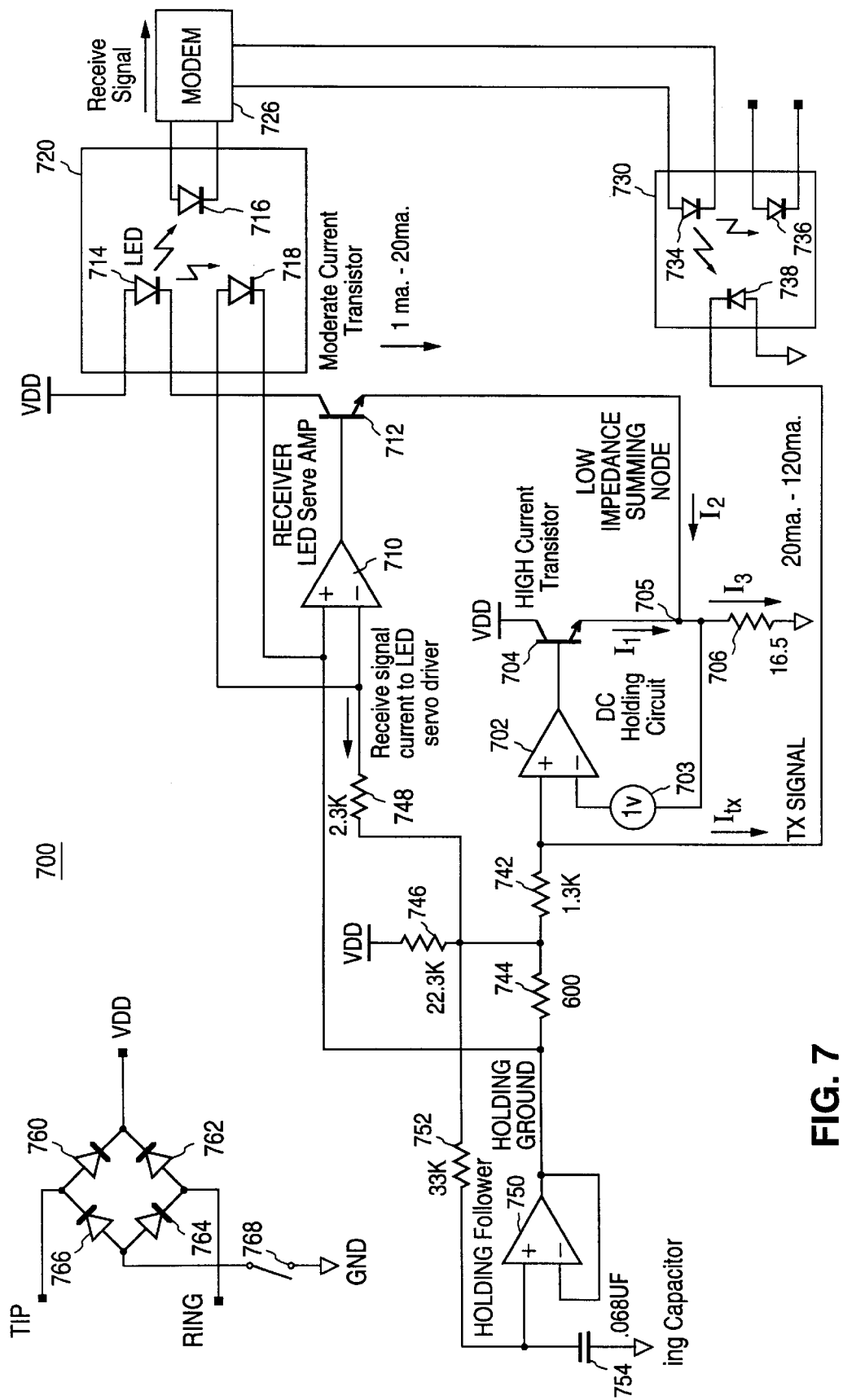
FIG. 7 is a simplified circuit diagram of an embodiment of the combination receive LED drive circuit, DC holding circuit, 600 ohm AC termination and transmit signal output circuit of the present invention.

DAA 700 of FIG. 7 illustrates an embodiment of the present invention which combines a receive LED circuit, holding circuit, 600 ohm termination and transmit driver.

The audio signal received from Tip and Ring appears as an AC signal superimposed on $V_{DD}$. Resistors 744 (600 ohm) and 746 (22.3K ohm) combine to form a resistive divider network that presents a 600 ohm impedance termination for AC signal on Tip and Ring but which does draw current which is separate from the holding circuit.

The audio signal is coupled to the inverting terminal of amplifier 710 through resistor 746 and 748. Amplifier 710 amplifies the audio signal and drives the base of LED drive current transistor 712, which is a moderate current transistor. The amplified audio signal causes transistor 712 to produce a modulated LED drive current $I_2$ that runs from $V_{DD}$ through the receive LED 714 of opto-isolator 720, through transistor 712 to low impedance summing node 705. Receive servo LED 718 is also coupled to the inputs of amplifier 710 to linearize the behavior of receive LED 714.

The holding current $I_3$ is maintained at a substantially constant predetermined magnitude through resistor 706 by DC holding circuit amp 702. The voltage signal present at low impedance summing node 705 is coupled through 1 Volt biasing device 703 to the inverting terminal of amp 702 to form a negative feedback loop. The output of amp 702 drives the base of high current transistor 704 to produce holding correction current $I_1$. The negative feedback of the voltage at summing node 705 causes $I_1$ to be modulated so as to compensate for the variations in $I_2$ and maintain $I_3$ at a substantially constant level and eliminate feedback of the received audio signal back onto Tip and Ring.

The magnitude of holding current $I_3$ is determined by the holding follower circuit including holding follower amp 750. The non-inverting terminal of holding amp 750 is coupled to GND through holding capacitor 754 (0.068 μF) and to $V_{DD}$ through resistors 752 (33 Kohm) and 746. In this configuration, holding capacitor 754 charges from $V_{DD}$ through resistors 752 and 746 to determine the holding current. This results in a circuit with a high RC constant which slowly follows the variations in the voltage at $V_{DD}$ which results in the amp 750 adjusting its output level to compensate for DC variations without reacting to the AC signal components present at VDD. The high input impedance of amp 750 permits holding capacitor 754 to be relatively small.

The output of amp 750 is coupled through resistors 744 and 742 (1.3 Kohm) to the non-inverting terminal of amp 702. The output current from amp 750 thereby controls the DC level of currents $I_1$ and $I_3$ of the holding circuit.

Transmit signals from modem 726 are transmitted to the line side of DAA 700 by transmit LED 734 and are received by transmit LDD 738 of transmit opto-isolator 730. The transmit signal from LDD 738 is coupled to the non-inverting terminal of amp 702. The transmit signal passes through amp 702 to transistor 704 where it modulates current $I_1$. By modulating current $I_1$, the transmit signal is superimposed on $V_{DD}$ and makes its way through $V_{DD}$ to the Tip and Ring terminals of the telephone line pair. By integrating the transmit driver with the holding circuit, no additional current is required for transmission of the transmit signal.

Figure 8:
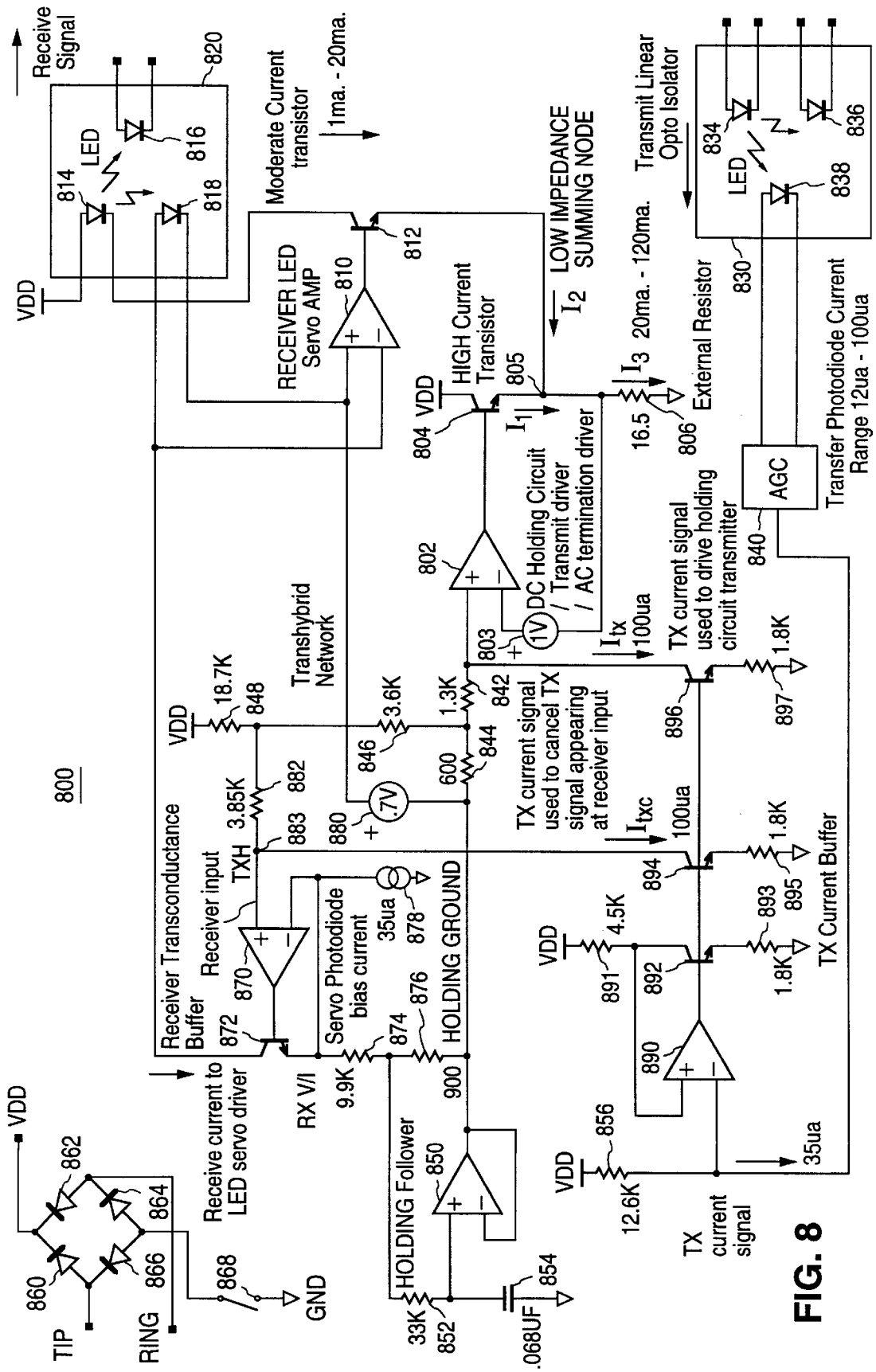
FIG. 8 is a circuit diagram of another embodiment of the combination receive LED drive circuit, DC holding circuit, 600 ohm AC termination and transmit signal output circuit of the present invention.

DAA 800 of FIG. 8 is an embodiment of the present invention which is similar to DAA 700 of FIG. 7 but which also includes a more complex transmit driver including automatic gain control, an integrated transhybrid network and improved stability.

Resistors 844 (600 ohm), 846 (3.6 Kohm) and 848 (18.7 Kohm) combine to form the 600 ohm impedance termination circuit. The audio signal received from Tip and Ring routes through $V_{DD}$, resistor 848 and resistor 882 to the non-inverting input of receiver transconductance buffer amplifier 870. The output of transconductance buffer amp 870 drives the base of transistor 872 to convert the received audio signal from a voltage to a current. The audio current signal is then coupled to the inverting input of amp 810 where it modulates current $I_2$ in moderate current transistor 812 to drive receive LED 814. Current source 878 is connected to the inverting input of transconductance buffer amp 870 to establish a 35 $\mu$A biasing current for receive servo LDD 818 which is coupled to transistor 872 and also across the input terminals of amp 810.

Holding circuit amp 802 drives high current transistor based on the output of holding follower amp 850 and the voltage signal at low impedance summing node 805 to generate current $I_1$ which establishes holding current $I_3$ through external resistor 806 (16.5 ohm) and compensate for variations in receive LED drive current $I_2$.

Holding capacitor 854 is charged by current flowing from $V_{DD}$ through resistors 848, 846, 844, 876 (900 ohm) and 852 (33 Kohm) and drives the non-inverting input of holding follower amp 850 with a voltage value that varies slowly with DC variations in $V_{DD}$. The signal output by holding follower amp 850 is coupled to the non-inverting input of holding amp 802 through resistors 844 and 842 (1.3 Kohm).

A transhybrid circuit is included which generates a transmit current signal $I_{txc}$ which is used to cancel a transmit signal which appears at the non-inverting input of receiver transconductance buffer amp 870 at node 883.

The transmit signal is received on the transmit LDD 838 of transmit opto-isolator 830. The transmit signal passes through AGC 840 to normalize its gain. The normalized transmit signal produced by AGC 840 is coupled to the inverting input terminal of transmit current buffer amp 890 and through resistor 858 (12.5 Kohm) to $V_{DD}$. The output of amp 890 drives the base of transistor 892 which controls the current flowing through resistor 891 (4.5 Kohm) and resistor 893 (1.8 Kohm) and feeds back to the non-inverting terminal of amp 890. Buffer amp 890 raises the DC level of the transmit current signal received at its inverting input terminal and outputs the resulting transmit signal to transistor 896 to produce modulated current $I_{tx}$, which is on the order of 100 $\mu$/A.

Transistor 896 is coupled to the non-inverting input terminal of holding circuit amp 802 so that current signal $I_{tx}$ produces a modulated voltage at the input of holding circuit amp 802 which, in turn, modulates current $I_1$ running through high current transistor 804 with the transmit signal received from transmit opto-isolator 830.

Modulating $I_1$ with the transmit signal causes the inverted transmit signal to appear on $V_{DD}$ and the transmit signal is thereby transmitted onto Tip and Ring.

The inverted transmit signal on $V_{DD}$ also arrives at the input of receiver buffer amp 870. However, the transmit signal output from transmit current buffer amp 890 also drives the base of transistor 894 to produce a cancellation transmit current signal $I_{txc}$ which is also coupled to the non-inverting input of receiver buffer amp 870. The summation of the transmit current signal $I_{txc}$ and the inverted transmit signal arriving through $V_{DD}$ serves to partially cancel the effects of $I_{tx}$. The transmit signal is typically around 10 to 15 dB greater in magnitude than the receive signal. Whereas a certain amount of feedback, or sidetone, of the transmit signal into the receive channel is expected and sometimes desired, the greater the magnitude of the reflected transmit signal, the greater the dynamic range required of the analog to digital converter in the modem.

While the above embodiments have been described in the context of linear opto-isolators, it will be apparent to those skilled in the art that the present invention is applicable to other current driven isolation transfer devices which would benefit from the use of a DAA which efficiently generates drive current with substantially no feedback to the tip and ring of an attached telephone line pair. Furthermore, while the embodiments above are illustrated with bipolar transistors, one skilled in the art will appreciate that the present invention may be modified to utilize other types of transistor devices having a control terminal, such as a base or gate, controlling the flow of current between a pair of current terminals, such as a collector and emitter or drain and source.

Although only certain embodiments have been described in detail, those having ordinary skill in the art will certainly understand that many modifications are possible without departing from the teachings hereof. All such modifications are intended to encompassed within the following claims.

I claim:

1. A data access arrangement circuit for coupling a telephone line pair to a current driven communications transfer device, wherein the telephone line pair comprises a tip terminal and a ring terminal, and wherein the current driven communications transfer device includes first and second terminals, the data access arrangement circuit comprising:

a first transistor having a control terminal and first and second current terminals, wherein the first current terminal is DC coupled to the tip terminal and the first terminal of the current driven communications transfer device;

a second transistor having a control terminal and first and second current terminals, wherein the first current terminal of the second transistor is DC coupled to the second terminal of the current driven communications transfer device, and the second current terminal of the second transistor is DC coupled to the second current terminal of the first transistor to form a summing node having a voltage;

a first resistor DC coupled between the ring terminal and a sense node;

a current drive circuit having input and output terminals, wherein the input terminal is AC coupled to the tip terminal, the output terminal is DC coupled to the control terminal of the second transistor, the current drive circuit operative to generate a current drive signal at the output terminal that causes a first current to flow between the first and second current terminals of the second transistor, and the current drive circuit is also operative to modulate the current drive signal in response to an audio input signal present at the tip and ring terminals and received at the input terminal of the current drive circuit; and a current correction circuit having input and output terminals, wherein a line input terminal is DC coupled to the summing node, and wherein the output terminal of the current correction circuit is DC coupled to the control terminal of the first transistor, current correction circuit operative to generate a current correction signal at the output terminal of the current correction circuit to cause a second current to flow between the first and second current terminals of the first transistor, wherein the current correction circuit is operative to modulate the current correction signal in response to the voltage at the summing node received at the input terminal of the current correction circuit such that a third current flowing between the summing node and the ring terminal through the first resistor remains at a substantially constant predetermined magnitude.

2. The data access arrangement of claim 1, wherein the third current is substantially equal to a predetermined holding current.

3. The data access arrangement of claim 2, wherein the current correction circuit further comprises:

an operational amplifier having non-inverting and inverting input terminals and an output terminal, wherein the inverting input terminal is coupled to the summing node, and wherein the non-inverting input terminal is DC coupled to the tip terminal, and further wherein the output terminal is coupled to the control terminal of the first transistor.

4. The data access arrangement of claim 3 wherein the operational amplifier is a first operational amplifier, further comprising:

a second operational amplifier having non-inverting and inverting input terminals and an output terminal, the inverting terminal of the second operational amplifier DC coupled to the output terminal of the second operational amplifier, the non-inverting input terminal of the second operational amplifier is DC coupled to the tip terminal, and the output terminal of the second operational amplifier is DC coupled to the non5 inverting input terminal.

5. The data access arrangement of claim 1, wherein the current driven communications transfer device comprises:

an opto-isolator including a light emitting diode having an anode and a cathode, wherein the first terminal of the current driven communications transfer device is the anode of the light emitting diode and the second terminal of the current driven communications transfer device is the cathode of the light emitting diode.

6. The data access arrangement of claim 5, wherein the current drive circuit further comprises:

a first feedback terminal coupled to a first terminal of a light detecting diode of the opto-isolator; and a second feedback terminal coupled to a second terminal of the light detecting diode of the opto-isolator, wherein the current drive circuit further modulates the light emitting diode drive signal in response to a feedback signal from the light detecting diode such that the response of the opto-isolator is linearized.

7. A data access arrangement for coupling between a telephone line pair having tip and ring terminals and an opto-isolator including a light emitting diode having an anode and a cathode, the data access arrangement comprising:

a first terminal coupled to the tip terminal of the telephone line pair;

a second terminal coupled to the ring terminal of the telephone line pair;

a third terminal coupled to the anode of the light emitting diode;

a fourth terminal coupled to the cathode of the light emitting diode;

a light emitting diode drive current circuit for generating a first current flow in a current path from said first terminal through said third and fourth terminals to a node, wherein said light emitting diode drive current circuit modulates said first current flow in response to an audio signal received from the telephone line pair at said first and second terminals of said data access arrangement; and a holding current correction circuit for generating a second current flow from said first terminal to said node, wherein said holding current correction circuit modulates said second current flow in response to a voltage at said node such that a third current flow from said node to said second terminal remains at a substantially constant predetermined magnitude.

8. The data access arrangement of claim 7, wherein the holding current correction circuit further comprises:

a high current transistor having a control terminal and first and second current terminals, the first current terminal being coupled to said first terminal and the second current terminal being coupled to said node; and a first amplifier having an inverting input terminal and an ouput terminal, the output terminal being coupled to the control terminal of said high current transistor and the inverting input terminal being coupled to said node.

9. The data access arrangement of claim 8, wherein the light emitting diode drive current circuit further comprises:

a low current transistor having a control terminal and first and second current terminals, the first current terminal being coupled to said fourth terminal and the second current terminal being coupled to said node; and a second amplifier having input and output terminals, the input terminal being ac coupled to the tip terminal of the telephone line pair and the output terminal being coupled to the control terminal of the low current transistor.

10. A method for controlling current flow in a data access arrangement coupled between a line pair having tip and ring terminals and an opto-isolator having a light emitting diode, the method comprising the steps of:

generating a first current in a first current path that runs from the tip terminal through the light emitting diode to a sense node;

producing a second current in a second current path that runs from the tip terminal to the sense node;

modulating the first current in response to an audio input signal received from the tip terminal; and modulating the second current in response to a voltage generated at the sense node such that a third current flowing from the sense node to the ring terminal remains at a substantially constant predetermined magnitude.

11. A method of coupling a telephone line pair having tip and ring terminals to an opto-isolator having a light emitting diode, the method comprising the steps of:

generating a first current in a first current path, the first current path including the tip terminal, the light emitting diode and a circuit for holding off-hook the telephone line pair, for transmitting a signal to the telephone line pair and for AC terminating the telephone line pair, the circuit having a sense node;

generating a second current in a second current path that runs from the tip terminal to the sense node;

modulating the first current in response to an audio input signal received from the tip terminal; and modulating the second current in response to a voltage generated at the sense node such that a third current flowing from the sense node to the ring terminal remains at a substantially constant predetermined magnitude.

12. The method of claim 11, further comprising the steps of:

sensing an output of the light emitting diode; and adjusting the value of the second current in response to the sensed output of the light emitting diode.

13. The method of claim 11, further comprising the steps of:

automatically adjusting the level of a transmit signal provided to an input of a transmit buffer amplifier.

* * * * *